United States Patent
Kritt et al.

(10) Patent No.: US 10,296,202 B2
(45) Date of Patent: *May 21, 2019

(54) DISAMBIGUATION OF TOUCH-BASED GESTURES

(71) Applicant: International Business Machines Corporation, Armonk, NY (US)

(72) Inventors: Barry A. Kritt, Atlantic Beach, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 91 days.

This patent is subject to a terminal disclaimer.

(21) Appl. No.: 14/837,340

(22) Filed: Aug. 27, 2015

(65) Prior Publication Data
US 2016/0034134 A1 Feb. 4, 2016

Related U.S. Application Data (63) Continuation of application No. 14/307,866, filed on Jun. 18, 2014.

(51) Int. Cl.
*G06F 3/041* (2006.01)
*G06F 3/0481* (2013.01)
*G06F 3/0488* (2013.01)

(52) U.S. Cl.
CPC .......... *G06F 3/0488* (2013.01); *G06F 3/0412* (2013.01); *G06F 3/0416* (2013.01); *G06F 3/0418* (2013.01); *G06F 3/04812* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2009/0006958 A1* | 1/2009 | Pohjola | G06F 3/0488 715/710 |
| 2009/0064047 A1* | 3/2009 | Shim | G06F 3/0482 715/835 |
| 2009/0138823 A1* | 5/2009 | Bradea | G06F 3/04817 715/835 |
| 2009/0327977 A1* | 12/2009 | Bachfischer | B60K 35/00 715/863 |

(Continued)

FOREIGN PATENT DOCUMENTS

WO 2013098250 A1 7/2013

*Primary Examiner* — Matthew Yeung
(74) *Attorney, Agent, or Firm* — Garg Law Firm, PLLC; Tihon Poltavets (57) ABSTRACT

At an application executing using a processor in a touch-sensitive device, a detection is made that the touch-based gesture does not correspond to a perimeter defining a action, wherein the touch-based gesture is made relative to the touch-sensitive device. A set of possible actions intended by the touch-based gesture is determined. Using a disambiguation rule, an action is selected from the set of possible actions, wherein the selected action matches an action computed using the disambiguation rule. The selected action is caused to occur at the touch-sensitive device.

15 Claims, 9 Drawing Sheets

(56) References Cited

U.S. PATENT DOCUMENTS

2010/0299592 A1* 11/2010 Zalewski .............. G06F 1/1626
715/243
2013/0082962 A1    4/2013 Jo et al.
2013/0285931 A1* 10/2013 Engdahl ................ G06F 3/0416
345/173

* cited by examiner

DISAMBIGUATION OF TOUCH-BASED GESTURES

TECHNICAL FIELD

The present invention relates generally to a method for using touch-based gestures. More particularly, the present invention relates to a method for disambiguation of touch-based gestures.

BACKGROUND

Many modern devices allow a user to touch a screen as a way of providing a user-input. A touch-based input or a touch-based gesture is a manner of providing a user input by touching a touch-sensitive device. Some touch-based gestures are a single point tap or touch, e.g., with a single finger or stylus. Other touch-based gestures are more complex, e.g., a swiping motion with a finger or stylus, tapping with more than one fingers or styli, or drawing patterns on the device with one or more fingers or styli.

Any device capable of accepting a touch-based input is referred to herein as a touch-based device. A computer monitor, a smartphone display screen, and a screen of a tablet computing device are all examples touch-based devices employing touch-sensitive screens. A touch-sensitive screen allows a user to touch the screen at different locations, in different manners, or a combination thereof, to provide touch-based inputs.

An application executing on the touch-based device accepts the inputs to perform certain operations. Often, the application presents a graphical display on the touch-sensitive screen to guide the user in performing the touch-based gesture.

For example, an application may present the well-known "OK" and "Cancel" operations as button graphics on the graphical user interface (GUI) of a touch-based device. The user taps or touches one of those button graphics to indicate the user's selection to the application. The application accepts the touch as a user-input, determines the location and/or the manner of the touch, correlates the location with a location of one of the button graphics, and performs the action corresponding to that button graphic which matches the location of the touch.

SUMMARY

The illustrative embodiments provide a method for disambiguation of touch-based gestures. An embodiment includes a method for disambiguation of a touch-based gesture. The embodiment detects, at an application executing using a processor in a touch-sensitive device, that the touch-based gesture does not correspond to a perimeter defining a action, wherein the touch-based gesture is made relative to the touch-sensitive device. The embodiment determines a set of possible actions intended by the touch-based gesture. The embodiment selects, using a disambiguation rule, an action from the set of possible actions, wherein the selected action matches an action computed using the disambiguation rule. The embodiment causes the selected action to occur at the touch-sensitive device.

Another embodiment includes a computer usable program product comprising a computer readable storage device including computer usable code for disambiguation of a touch-based gesture. The embodiment further includes computer usable code for computer usable code for detecting, at an application executing using a processor in a touch-sensitive device, that the touch-based gesture does not correspond to a perimeter defining a action, wherein the touch-based gesture is made relative to the touch-sensitive device. The embodiment further includes computer usable code for determining a set of possible actions intended by the touch-based gesture. The embodiment further includes computer usable code for selecting, using a disambiguation rule, an action from the set of possible actions, wherein the selected action matches an action computed using the disambiguation rule. The embodiment further includes computer usable code for causing the selected action to occur at the touch-sensitive device.

Another embodiment includes a data processing system for disambiguation of a touch-based gesture. The embodiment further includes a storage device including a storage medium, wherein the storage device stores computer usable program code. The embodiment further includes a processor, wherein the processor executes the computer usable program code. The embodiment further includes computer usable code for computer usable code for detecting, at an application executing using a processor in a touch-sensitive device, that the touch-based gesture does not correspond to a perimeter defining an action, wherein the touch-based gesture is made relative to the touch-sensitive device. The embodiment further includes computer usable code for determining a set of possible actions intended by the touch-based gesture. The embodiment further includes computer usable code for selecting, using a disambiguation rule, an action from the set of possible actions, wherein the selected action matches an action computed using the disambiguation rule. The embodiment further includes computer usable code for causing the selected action to occur at the touch-sensitive device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that touch-based inputs require a certain degree of dexterity and precision on the part of the user to make accurate inputs. For example, presently, a touch input is recognized as an input only when the touch is made within a defined perimeter on the touch-sensitive screen. A perimeter is a boundary, visible or invisible, defined on a touch-sensitive device such that a touch-based gesture received within the boundary is understood by the touch-sensitive device as a specific input to the application. Some examples of the perimeter in the visible form include but are not limited to button graphics, icons, checkboxes, radio buttons, image or image portions, dotted or otherwise marked outlines, defined areas, object representations, and the like.

The illustrative embodiments recognize that sometimes, a user can touch a screen in an unintended manner. For example, accidentally, or when manipulating a touch-sensitive device in shaky conditions, a user can make a touch-based gesture that does not land precisely in a particular defined perimeter, occupies more than one perimeters, occupies an unintended perimeter, or a combination thereof, on the touch-sensitive screen.

As an example, it is not uncommon for a user to touch two icons on a GUI while intending to touch only one of those icons. Such a problem is more pronounced and commonly experienced when the icons are comparatively smaller than the user's finger or stylus. Slippery screen surfaces also cause a touch-based gesture to slide or drift from an intended perimeter into an unintended perimeter.

As another example, as the user's finger or stylus approaches the screen to make a touch-based gesture, the finger, or other limb extensions, or the stylus body can obscure the perimeter that is the target of the touch. Consequently, what begins as a directed approach to the perimeter in view becomes a touch at an obscured perimeter by the time the finger or the stylus actually touches the screen, sometimes causing the touch to miss the perimeter or intrude into other perimeters.

The illustrative embodiments used to describe the invention generally address and solve the above-described problems and other problems related to using touch-based gestures. The illustrative embodiments provide a method, system, and computer program product for disambiguation of touch-based gestures.

An embodiment creates one or more disambiguation rule for a given context. A context is the circumstances of a touch-based input, including information that is useful in determining a meaning of the touch-based input. For example, when a user is editing a document, the context of a touch-based input includes the information about the document, e.g., the type of document. The context further includes information about editing operations, e.g., the type of editing being performed, selectable editing options being presented at the time of the touch-based input, and so on.

The context can also include one or more dimensions, such as the dimensions of the touch-sensitive device, the area where the document is displayed, sizes of the perimeters of the editing options offered, and so on. These example types of information included in the context are not intended to be limiting on the illustrative embodiments. From this disclosure, those of ordinary skill in the art will be able to conceive many other types of information useful in determining a meaning of a touch-based input and the same are contemplated within the scope of the illustrative embodiments.

A disambiguation rule according to the illustrative embodiments is logic usable for ascertaining one meaning of a touch-based input when more than one meaning are possible from the touch-based input within the given context. Generally, when a touch-based input does not match with any perimeters, matches more than one perimeter, is not in an expected location on a touch-sensitive device, is not of an expected type, or a combination thereof, an embodiment uses a disambiguation rule to ascertain the most probable meaning of the touch-based input.

For example, when a touch-based gesture makes contact in two adjacent perimeters, a disambiguation rule is usable to ascertain which of the two perimeters the user intended to use for the touch-based input. As another example, when a single finger tap is expected but a swipe is received as the touch-based input, an embodiment uses a disambiguation rule to ascertain that the single finger tap, and not the swipe, was most likely intended by the user. As another example, when a touch-based gesture contacts outside a perimeter, an embodiment uses a disambiguation rule to ascertain that the touch was most likely intended to contact a nearby perimeter, or a particular perimeter out of multiple nearby perimeters.

An embodiment creates one or more disambiguation rule for a given context by using the meanings of past touch-based gestures. For example, one embodiment observes the user operating in a similar context. The observation may be limited by time, by a sequence of operations, discrete events in the context, or other methods. For example, assume that the context is editing of a document. The embodiment observes and records the touch-based gestures performed by the user during the editing of one, two, or more documents.

Once the embodiment has made a sufficient record of touch-based gestures in a context, as limited by some criterion, the embodiment determines a sequence of the touch-based gestures used by the user in the context. The embodiment creates a workflow from the sequence. The embodiment then converts the workflow into a disambiguation rule logic. Within the scope of the illustrative embodiments, an embodiment can be configured to utilize a machine-learning technique to learn from a user's past actions and gestures, and autonomously construct disambiguation rules.

Assume that the user is operating in the context against, to wit, editing another document. Further assume that the user makes an ambiguous touch-based gesture, such as touching two adjacent perimeters representing two different operations during document editing. Using the disambiguation rule logic created in the above example, the embodiment determines where in the workflow the user is operating in the given context. The embodiment further determines from the disambiguation rule an operation that the user has previously used at the same point in the workflow. The embodiment compares the operations associated with the present ambiguous touch-based gesture with the previously used operation. If one of the operations associated with the present ambiguous touch-based gesture matches the previously used operation, the embodiment concludes that matching operation to be the most likely operation intended by the user. Operating in this example manner, an embodiment disambiguates the ambiguous touch-based gesture.

The example disambiguation rule in the above example can be constructed in other ways. For example, instead of observing the user, an embodiment uses a social network of users. For example, if the user is a document editor, the embodiment determines the sequence of operations used by one or more other document editors in a group of document editors. Operating in the above-described manner but with observations from a social network of similar users, the embodiment can construct a disambiguation rule that is usable with the user without any observation period. Such a disambiguation rule can be a default disambiguation rule, which can be tuned according to the user's particular sequence by another embodiment.

Another example manner of forming a disambiguation rule is by weighting the choices. For example, when a user is presented with more than one perimeter at a certain point in the sequence of operations in a context, which one does the user (or a social network or users) most often choose? Stated another way, because certain actions or operations are associated with certain perimeters, which action or operation does the user (or a social network of users) most often choose at certain points in the given context?

Depending upon the popularity of the various perimeter choices, an embodiment weights different perimeters differently. The most popular perimeter receives the highest weight, the least popular perimeter receives the lowest weight, and so on. The weighted perimeter options during various operations in a context are configured in one or more disambiguation rules.

An embodiment detects an ambiguous touch-based gesture from a user during an operation in a similar context. Using one or more disambiguation rules, the embodiment determines the weighting of the various perimeters proximate to the touch-based gesture. The embodiment selects the highest-weighted perimeter from such proximate perimeters as the most likely perimeter that was the target of the user's touch-based gesture.

One embodiment can further use a disambiguation rule that employs perimeter weighting to improve the touch-based gesture guidance for the user. For example, when a certain set of perimeters is about to be presented to the user, and the user is to select one perimeter from the set by providing a touch-based input, an embodiment can highlight or portray different perimeters according to their respective weights. Accordingly, the perimeter with the highest weight—the most likely candidate to receive the touch-based gesture—is highlighted in a manner to attract the user's attention and the touch-based gesture.

For example, one embodiment resizes the various perimeters according to their weights, or causes the various perimeters to be resized according to their weights. Thus, when presented to the user, the most likely candidate perimeter to receive the touch-based gesture is also the largest of all the perimeter options. Given a larger size, or other suitable highlighting of the most likely candidate perimeter in this manner, the user's touch-based gesture is more likely to contact that perimeter without ambiguity.

An embodiment can highlight the various perimeters in other ways. Other contemplated manners of highlighting a perimeter according to the perimeter's weight include but are not limited to changing colors according to a weighted color palette, coloring or shading according to a weight gradient, sizing according to a weight gradient, selecting fonts according to weights, blink-rate adjustment, snap-to attraction factor adjustment, and so on.

For example, a weighted color palette may use red for the most likely perimeter and yellow for the least likely perimeter, and other colors for perimeters with intermediate likelihoods. As another example, a coloring or shading according to a weight gradient may use a bright shade of red for the most likely perimeter and a pale shade of red for the least likely perimeter, and other shades for perimeters with intermediate likelihoods.

As another example, a blink-rate adjustment according to a weight gradient may use a rapid blinking for the most likely perimeter and slow blinking the least likely perimeter, and other blinking rates for perimeters with intermediate likelihoods. As another example, a snap-to attraction factor adjustment according to a weight gradient may use the highest degree of attractiveness for snapping a gesture to the most likely perimeter and the lowest degree of attractiveness for snapping a gesture to the least likely perimeter, and other degrees of attractiveness for perimeters with intermediate likelihoods.

The illustrative embodiments are described with respect to certain devices, screens, touch-based gestures, touch-based inputs, context, operations, workflows, sizes, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
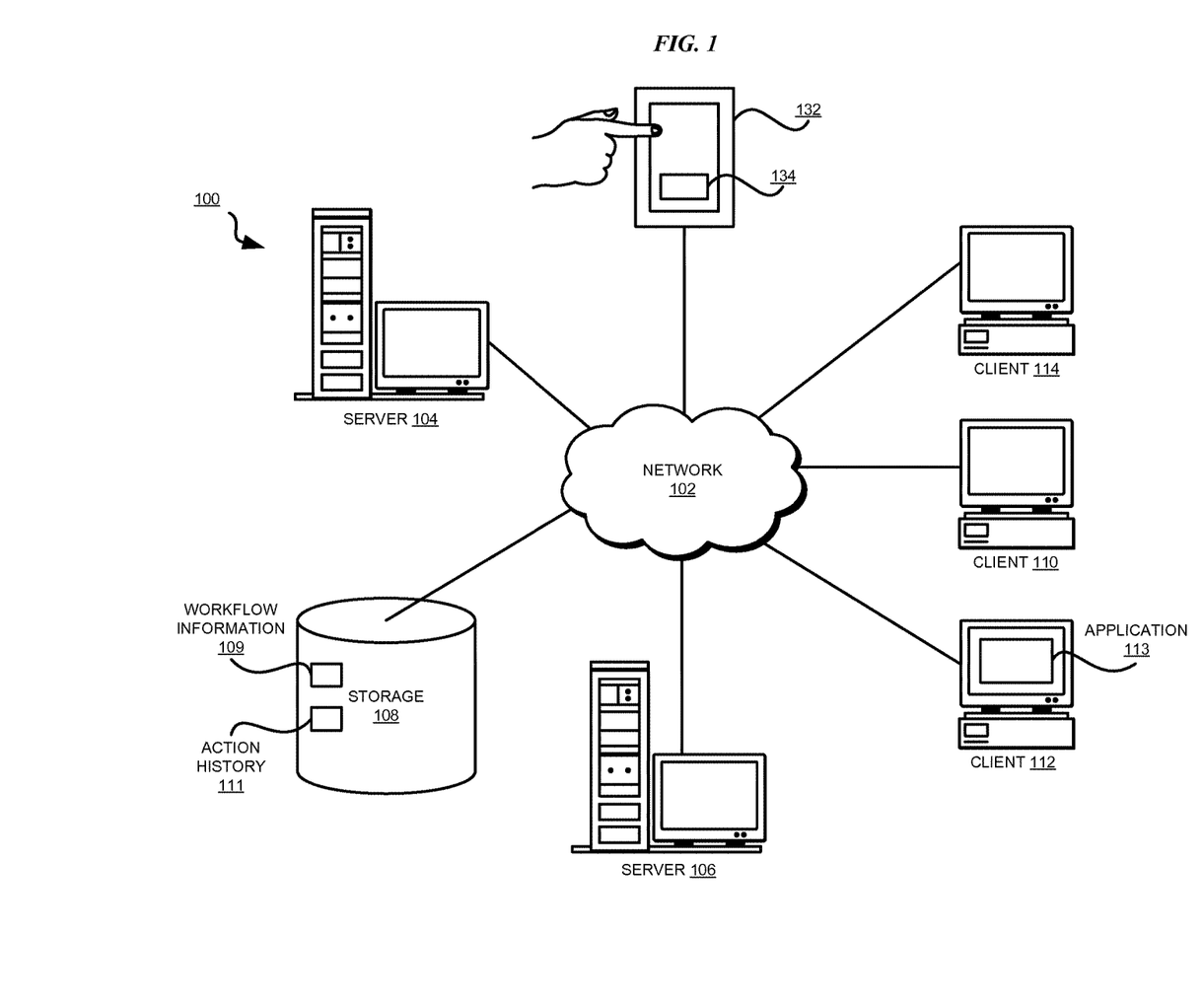
FIG. 1 depicts a block diagram of a network of data processing systems in which illustrative embodiments may be implemented.
Figure 2:
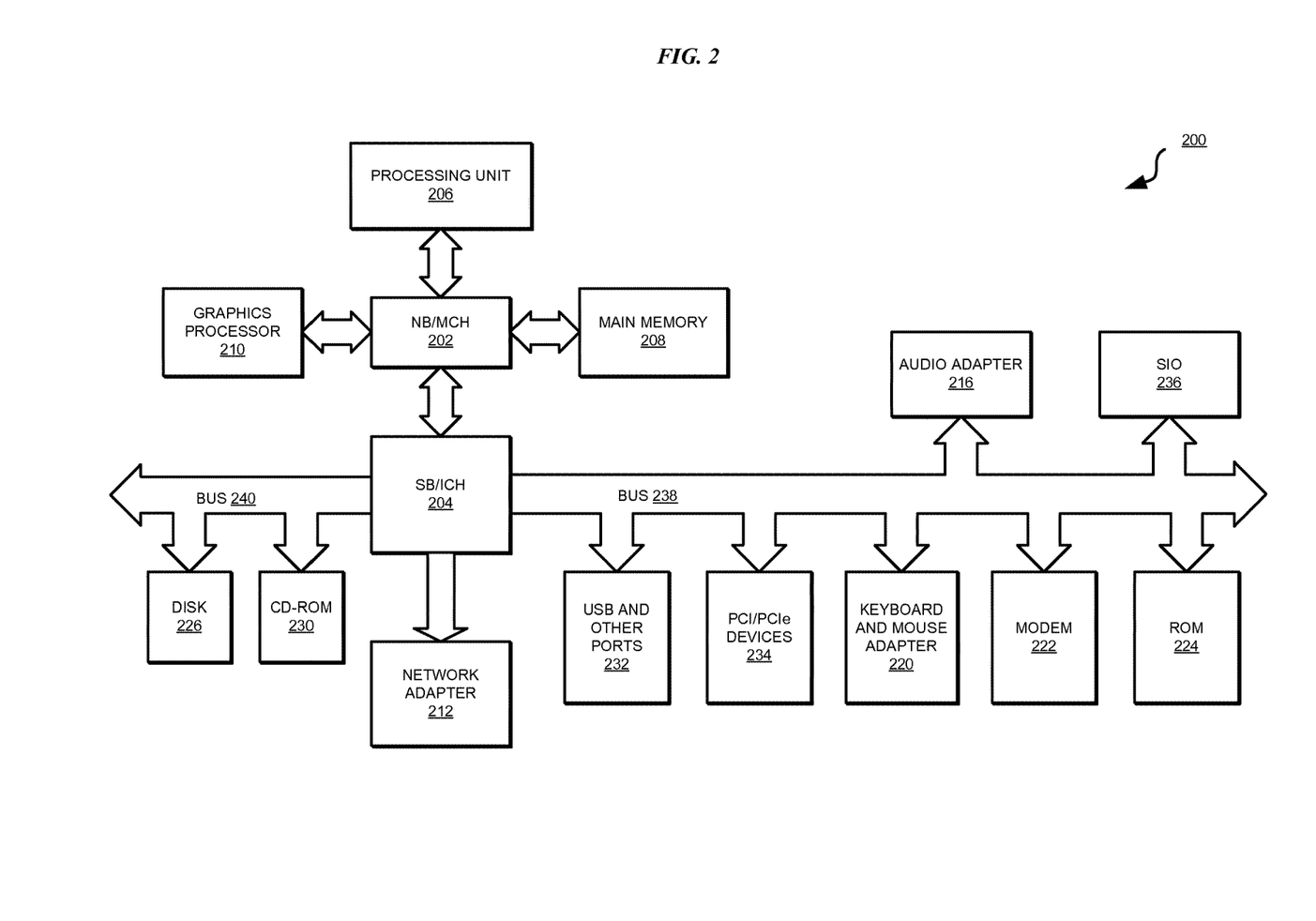
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 113 implements an embodiment described herein. Device 132 is a touch-based device, capable of receiving and using touch-based inputs, such as a touch from a user's finger as shown. Application 134 in device 132 implements an embodiment described herein. Workflow information 109 in storage 108 is one example way of storing sequence of operations or workflows for a disambiguation rule as described earlier. Action history 111 is one example way of storing information about which of the multiple perimeters (with associated actions) are more or less favored during various operations in various contexts, as described earlier for use with a disambiguation rule. Application 113 or application 134 use workflow information 109 action history 111, or both for creating and using disambiguation rules. In one embodiment, repository workflow information 109 action history 111, or both are associated with client 112, such as within client 112. Similarly, in one embodiment, all or part of workflow information 109 action history 111, or both are located within device 132 for use by application 134. In another embodiment, workflow information 109 action history 111, or both are accessible over a network from client 112 or device 132, as depicted.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 113 or application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
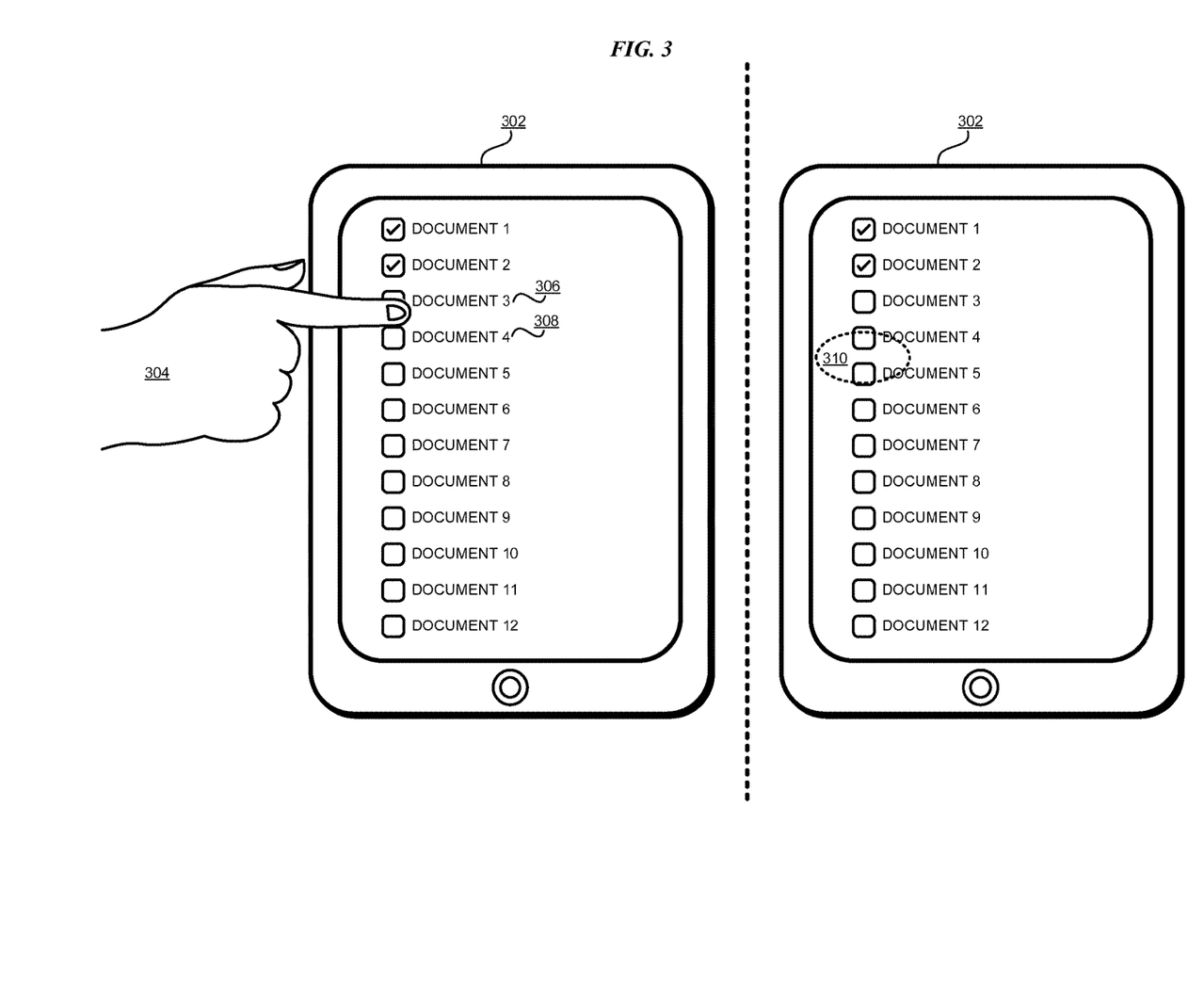
FIG. 3 depicts a block diagram of disambiguation of a touch-based gesture in accordance with an illustrative embodiment.

With reference to FIG. 3, this figure depicts a block diagram of disambiguation of a touch-based gesture in accordance with an illustrative embodiment. Device 302 is an example of device 132 in FIG. 1.

On the left side of the depiction in FIG. 3, device 302 displays a number of example options from which a user is supposed to select one of the options. Each example option, in this example depiction, is a separate document on which editing can be performed. Each option has a checkbox associated therewith for receiving a touch-based gesture. The checkbox itself or an invisible border around the checkbox is a perimeter to receive a touch-based gesture.

The user, using finger 304 makes a touch-based gesture with respect to device 302. As shown to illustrate the problem recognized by the illustrative embodiments, the touch-based gesture makes contact with device 302 somewhere between the perimeters of options 306 and 308. The right side of the depiction in FIG. 3 shows area 310, which represents the area of contact during the touch-based gesture.

Area 310 overlaps the perimeters of options 306 and 308. The user intended to select either "document 3" corresponding to option 306 or "document 4" corresponding to option 308, but because of the placement of the touch-based gesture in area 310, an application in device 302 cannot ascertain which document the user intended to select. An embodiment described herein disambiguates such a touch-based gesture made in area 310, associates the touch-based gesture in area 310 with option 306 or 308, and allows the application to select "document 3" or "document 4" accordingly.

For example, assume that the user has been editing documents 1 and 2 prior to making the touch-based gesture in area 310. An embodiment, such as in an application analogous to application 134 and executing in device 302, has made observations about a sequence of operations on documents 1 and 2. The application has recorded the observations that when the user closed document 1 after editing, the user selected document 2, the option adjacent to the closed document 1 on the display.

The application then determines, using a disambiguation rule, that the sequence of operations show that the user has closed document 2 after editing and has wanted to select another document thereafter. Based on the recorded observations and the options displayed to the user, the application, using a disambiguation rule, concludes that the user most probably wanted to repeat the same sequence of operations and select the option adjacent to the recently closed document, to wit, document 3. Accordingly, the application disambiguates the touch-based gesture in area 310 such that the touch-based gesture is regarded as if the touch-based gesture were made within the perimeter of option 306.

Figure 4:
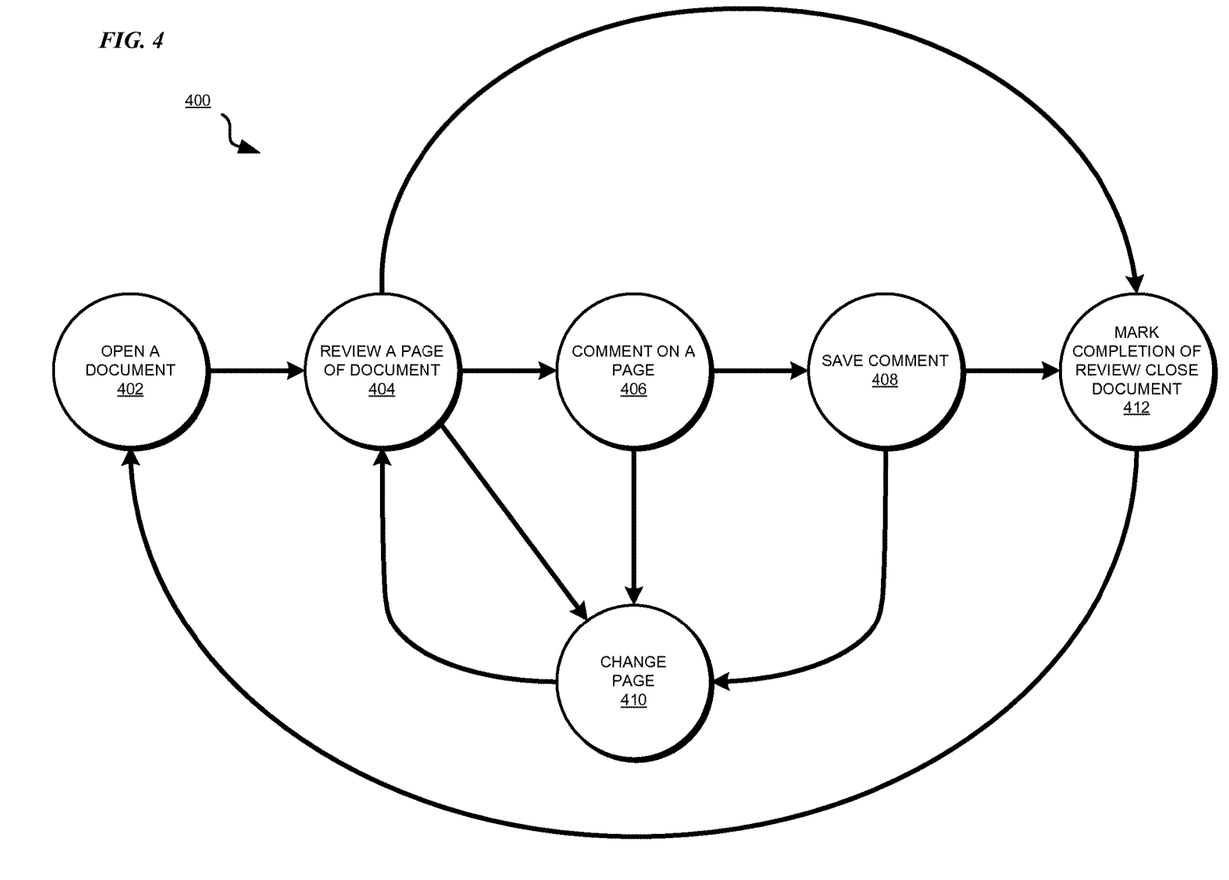
FIG. 4 depicts an example workflow constructed according to an observed sequence of operations in accordance with an illustrative embodiment.

With reference to FIG. 4, this figure depicts an example workflow constructed according to an observed sequence of operations in accordance with an illustrative embodiment. Workflow 400 corresponds to the observations made with respect to the operations prior to the selecting one of options 306 and 308 in FIG. 3.

As described with respect to FIG. 3, an application, such as application 134 in FIG. 1, or a corresponding application (not shown) in device 302 in FIG. 3, observes a sequence of operations the user performed with respect to other options displayed on device 302.

For example, from the recorded observations of operations on "document 1", "document 2", or both, the application constructs workflow 400. In workflow 400, opening a document, e.g., "document 1" starts workflow 400 and forms operation 402. Reviewing a page of the document forms operation 404 and follows operation 402. Commenting on the page being reviewed forms operation 406 and in some instances follows operation 404. When a page is commented upon, i.e. operation 406 is performed, in some instances, the comment is saved in operation 408.

In some instances, the user saves the comment on a page in operation 408 and proceeds to change the page in operation 410. In some other instances, the user reviews a page in operation 404 but does not comment on the page and directly proceeds to change the page in operation 410. In some instances, the user comments on a page in operation 406 but does not save the comment and directly proceeds to change the page in operation 410.

In some instances, such as after saving a comment in operation 408, the user marks the completion of review, to wit, closes the document, in operation 412. In some instances, the user reviews a page in operation 404 and directly proceeds to mark the completion of review, to wit, close the document, in operation 412. After closing the document in operation 412, the user opens a document, to wit, the next document in a series of documents presented as a list of options, in operation 402.

Workflow 400 thus reflects a sequence of observed operations in the context of editing a document. The application transforms workflow into the logic of a disambiguation rule using any available technique or methodology. The application later applies the disambiguation rule in disambiguation of touch-based gestures, e.g., for disambiguating the touch-based gesture in area 310 in FIG. 3.

Figure 5:
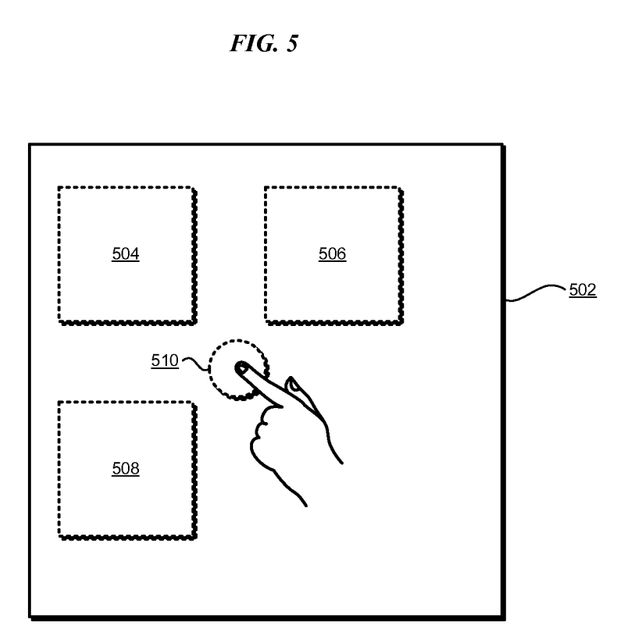
FIG. 5 depicts a block diagram of another example process of disambiguation of touch-based gestures in accordance with an illustrative embodiment.

With reference to FIG. 5, this figure depicts a block diagram of another example process of disambiguation of touch-based gestures in accordance with an illustrative embodiment. GUI 502 is presented on a touch-sensitive device, such as device 302 in FIG. 3.

GUI 502 shows three example perimeters—perimeters 504, 506, and 508. A user makes a touch-based gesture, which makes contact at area 510 as shown.

Notice that area 510 does not correspond with any of perimeters 504, 506, and 508. In a manner described elsewhere, an application associates weights with perimeters 504, 506, and 508. For example, the weight of perimeter 504 is greater than the weight of perimeter 506, and the weight of perimeter 506 is greater than or equal to the weight of perimeter 508. These weights are values computed from the user's own frequencies of selecting these various perimeters in the past, a community's past or ongoing frequencies of selecting these various perimeters, or a combination thereof, and suitably encoded for use according to a disambiguation rule.

Given the example relative weights of perimeters 504, 506, and 508, the application causes touch-based gesture at area 510 to become associated with perimeter 504. Thus, even though the user did not touch perimeter 504, the application uses the disambiguation rule to conclude that the user most probably intended to touch perimeter 504, and not perimeters 506 or 508.

Figure 6:
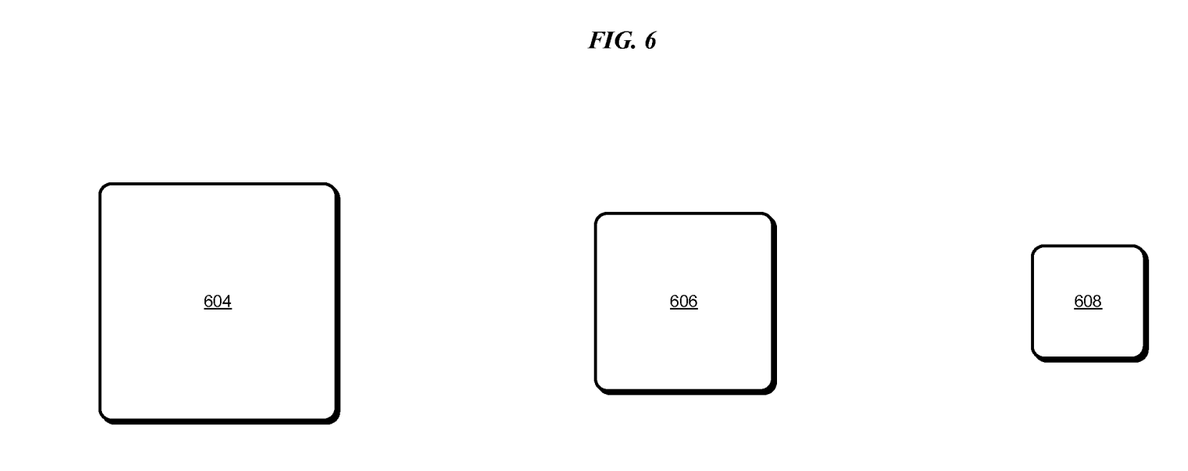
FIG. 6 depicts a block diagram of a process for enhancing touch-based gesture accuracy and reducing touch-based gesture ambiguity in accordance with an illustrative embodiment.

With reference to FIG. 6, this figure depicts a block diagram of a process for enhancing touch-based gesture accuracy and reducing touch-based gesture ambiguity in accordance with an illustrative embodiment. Perimeters 604, 606, and 608 are examples of perimeters 504, 506, and 508, respectively, in FIG. 5.

As described in the example with respect to FIG. 5, the weight of perimeter 604 is greater than the weight of perimeter 606, and the weight of perimeter 606 is greater than or equal to the weight of perimeter 608. The application has computed these relative weights before a user's touch-based gesture is received relative to these perimeters. Even with the knowledge of the relative weights available to the application, as depicted in FIG. 5, the touch-based gesture at area 510 is ambiguous as to towards which of perimeters 504, 506, and 508, the touch-based gesture is directed.

To further assist the user and avoid the ambiguity recognized and solved by the application in FIG. 5, the application resizes perimeters 504, 506, and 508 as perimeters 604, 606, and 608, respectively. Resized perimeters 604, 606, and 608 are then displayed or presented to the user in the manner analogous to the presentation of perimeters 504, 506, and 508 on GUI 502 in FIG. 5. Resized perimeter 604 is larger than perimeter 504 in FIG. 5, and increases the probability that area 510 will overlap with perimeter 604 as opposed to missing perimeter 504 as in FIG. 5.

Figure 7:
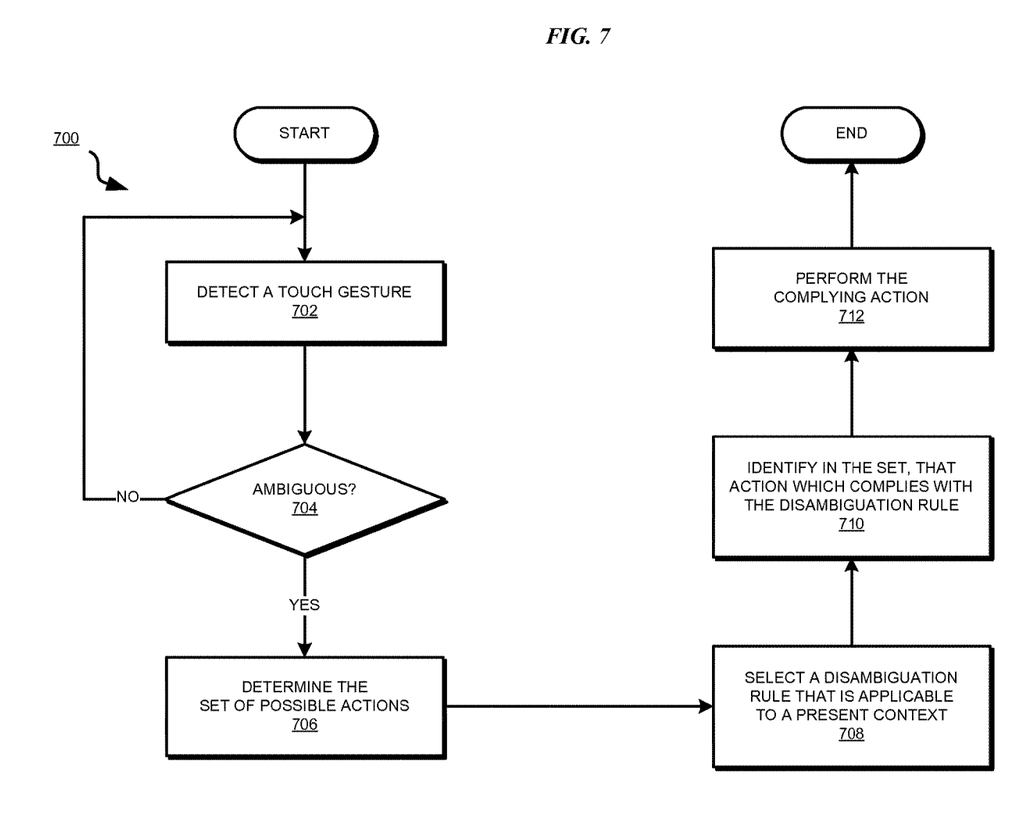
FIG. 7 depicts a flowchart of a process for disambiguation of touch-based gestures in accordance with an illustrative embodiment.

With reference to FIG. 7, this figure depicts a flowchart of a process for disambiguation of touch-based gestures in accordance with an illustrative embodiment. Process 700 can be implemented in application 134 in FIG. 1, or a corresponding application as described in FIGS. 3, 4, and 5.

The application detects a touch-based gesture (block 702). The application determines whether the touch-based gesture is ambiguous in one or more respects as described elsewhere in this disclosure (block 704). If the touch-based gesture is not ambiguous ("No" path of block 704), the application returns process 700 to block 702.

If the touch-based gesture is ambiguous ("Yes" path of block 704), the application determines a set of possible actions corresponding to the ambiguous touch-based gesture (block 706). For example, the application determines those candidate perimeters proximate to the touch-based gesture that could be the possible targets of the touch-based gesture, and determines a set of candidate actions corresponding to those candidate perimeters.

The application selects a disambiguation rule that is applicable to the context of the ambiguous touch-based gesture (block 708). The application identifies from the set of candidate actions that action which complies or corresponds with the disambiguation rule (block 710). The application performs the selected action (block 712). The application ends process 700 thereafter. In one embodiment, at block 712, the application passes the ambiguous touch-based gesture to another application as a disambiguated touch-based gesture at the perimeter corresponding to the selected action, and causes the other application to perform the action.

Figure 8:
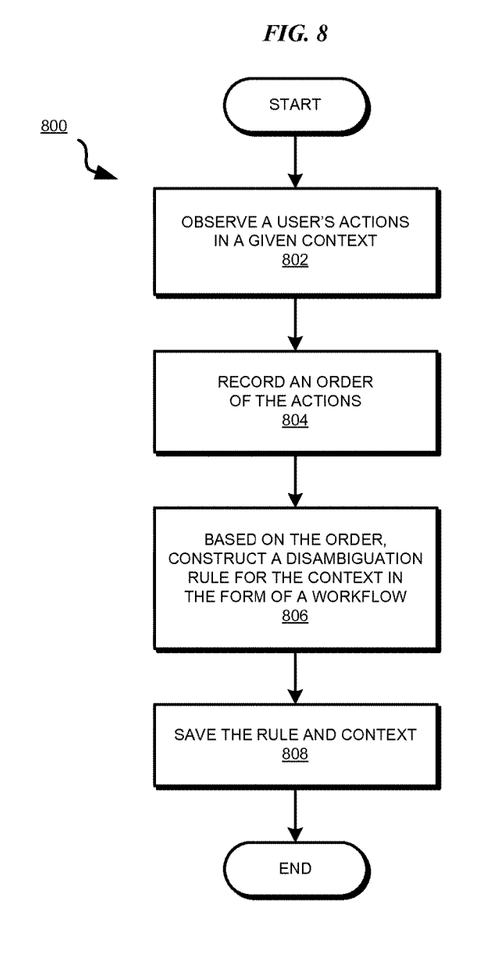
FIG. 8 depicts a flowchart of an example process for constructing a disambiguation rule in accordance with an illustrative embodiment.

With reference to FIG. 8, this figure depicts a flowchart of an example process for constructing a disambiguation rule in accordance with an illustrative embodiment. Process 800 can be implemented in application 134 in FIG. 1, or a corresponding application as described in FIGS. 3, 4, and 5.

The application observes a user's actions in a given context (block 802). The application records an order or sequence of the observed actions (block 804). Based on the order, the application constructs a disambiguation rule for the context in the form of a workflow, as described elsewhere in this disclosure (block 806). The application saves the disambiguation rule and the context to which the disambiguation rule applies (block 808). The application ends process 800 thereafter.

Figure 9:
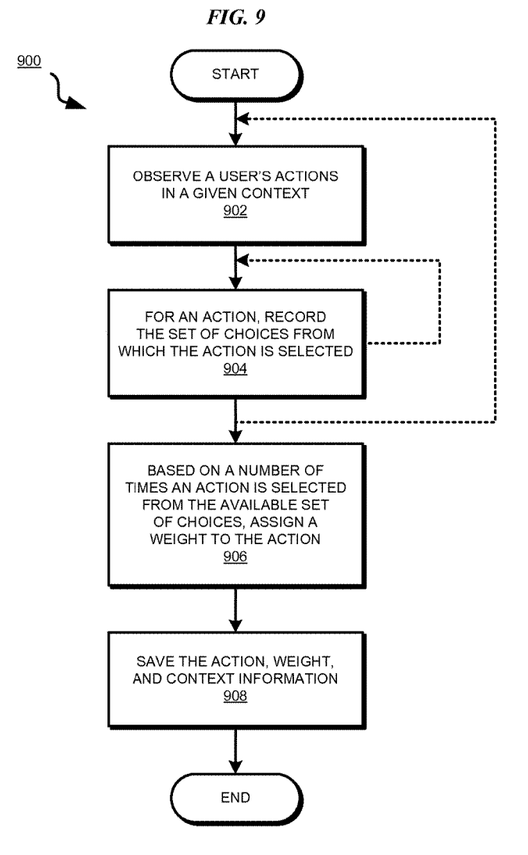
FIG. 9 depicts a flowchart of an example process for constructing a disambiguation rule in accordance with an illustrative embodiment.

With reference to FIG. 9, this figure depicts a flowchart of an example process for constructing a disambiguation rule in accordance with an illustrative embodiment. Process 900 can be implemented in application 134 in FIG. 1, or a corresponding application as described in FIGS. 3, 4, and 5.

The application observes a user's actions in a given context (block 902). For an observed action, the application records a set of choices from which the user selected the action (block 904). The application repeats block 904 for each observed action from block 802. The application repeats block 804 and 802 for as many points in the given context as many be needed.

Based on the number of times an action is selected from the available set of choices at that corresponding point in the context, the application assigns a proportional weight to the action (block 906). In one embodiment, the application assigns a weight to the choice that results in the action, the perimeter that defines that choice, or a combination thereof.

The application saves the actions, the weights, and the context information for use with a disambiguation rule in a similar context (block 908). The application ends process 900 thereafter.

Thus, a computer implemented method is provided in the illustrative embodiments for disambiguation of touch-based gestures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for disambiguation of a touch-based gesture, the method comprising:

detecting, at an application executing using a processor in a touch-sensitive device, that the touch-based gesture is not placed within a perimeter, wherein the touch-based gesture is made on a graphical user interface presented on the touch-sensitive device, and wherein the perimeter is a boundary defined on the touch-sensitive device such that when the touch-based gesture is placed within the perimeter the touch-based gesture corresponds to an action associated with the perimeter;

determining a set of possible actions intended by the touch-based gesture, the set of possible actions including a first possible action and a second possible action, the first possible action corresponding to a first perimeter and the second possible action corresponding to a second perimeter;

selecting, using a disambiguation rule, the first possible action from the set of possible actions, wherein the first possible action is more likely than the second possible action according to the disambiguation rule;

causing the first possible action to occur at the touch-sensitive device;

changing, responsive to the first possible action being more likely than the second possible action according to the disambiguation rule, a first property of the first perimeter relative to a first property of the second perimeter in the graphical user interface;

recording, at each time in a plurality of times prior to the touch-based gesture, whether a particular action selected from a group of action choices available at said each time, wherein the recording occurs in a context related to a second context in which the touch-based gesture is made, and wherein the context and the second context each comprises a common set of circumstances, the common set of circumstances being applicable when the touch-based gesture is made;

counting a first number of instances when the first action is selected from the group of action choices;

counting a second number of instances when the second action is selected from the group of action choices;

assigning a first weight to the first action, wherein the first weight is proportional to the first number of instances;

assigning a second weight to the second action, wherein the second weight is proportional to the second number of instances; and changing, at a time prior to the touch-based gesture, based on the first weight and the second weight, the first property of the first perimeter and the first property of the second perimeter in the graphical user interface, wherein the second property of the first perimeter is a size of the first perimeter and the second property of the second perimeter is a size of the second perimeter, and wherein changing, at a time prior to the touch-based gesture, enlarges the size of the first perimeter to be greater than the size of the second perimeter.

2. The method of claim 1, further comprising:

recording, at a time prior to the touch-based gesture, a sequence of actions in a context related to a second context in which the touch-based gesture is made, the context and the second context comprising a set of circumstances during which the touch-based gesture is made; and constructing, based on the sequence, a workflow disambiguation rule, wherein when the workflow disambiguation rule is used in the second context, the disambiguation rule identifies an action in the sequence that should occur in the second context responsive to the touch-based gesture.

3. The method of claim 1, further comprising:

constructing, based on the first weight and the second weight, a weighting disambiguation rule, wherein when the weighting disambiguation rule is used in the second context, the disambiguation rule identifies a higher weighted action from the first action and the second action as an unambiguous action that should occur in the second context responsive to the touch-based gesture.

4. The method of claim 1, further comprising:

manipulating the touch-based gesture to form a manipulated touch-based gesture; and passing the manipulated touch-based gesture to a second application such that the manipulated touch-based gesture causes the second application to perform the selected action.

5. The method of claim 1, further comprising:

selecting the disambiguation rule from a set of disambiguation rules, wherein the disambiguation rule applies to a context in which the touch-based gesture is made, the context comprising a set of circumstances during which the touch-based gesture is made.

6. The method of claim 5, further comprising:

determining a portion of the context where the touch-based gesture is made, wherein different disambiguation rules apply to different portions of the context, and wherein the portion of the context comprises an activity being performed on the touch-sensitive device and the touch-based gesture is intended to manipulate the activity.

7. The method of claim 1, wherein the first perimeter and the second perimeter are members of a set of perimeters and each action in the set of possible actions has a related perimeter in the set of perimeters, the set of perimeters being available on the touch-sensitive device at the time the touch-based gesture is made, and wherein a particular action in the set of possible action is intended by the touch-based gesture when the touch-based gesture corresponds with a perimeter related to the particular action.

8. The method of claim 1, wherein the touch-based gesture does not correspond to the first perimeter by overlapping with the first perimeter and the second perimeter simultaneously.

9. The method of claim 1, wherein the first perimeter is a member of a group of perimeters, each member of the group of perimeters being situated proximate to a location of the touch-based gesture, and wherein the touch-based gesture does not correspond to any single member of the group of perimeters.

10. The method of claim 1, changing, responsive to the first possible action being more likely than the second possible action according to the disambiguation rule, enlarges the size of the first perimeter relative to the second perimeter.

11. The method of claim 1, wherein a second property of the first perimeter is a color of the first perimeter and a second property of the second perimeter is a color of the second perimeter, and wherein changing, responsive to the first possible action being more likely than the second possible action according to the disambiguation rule, changes the color of the first perimeter to be brighter than the color of the second perimeter.

12. The method of claim 1, wherein a second property of the first perimeter is a blink rate of the first perimeter and a second property of the second perimeter is a blink rate of the second perimeter, and wherein changing, responsive to the first possible action being more likely than the second possible action according to the disambiguation rule, changes the blink rate of the first perimeter to be greater than the blink rate of the second perimeter.

13. The method of claim 1, wherein a second property of the first perimeter is a font associated with the first perimeter and a second property of the second perimeter is a font associated with the second perimeter.

14. The method of claim 1, further comprising:
displaying in the graphical user interface the enlarged size of the first perimeter.

15. A method for disambiguation of a touch-based gesture, the method comprising:
detecting, at an application executing using a processor in a touch-sensitive device, that the touch-based gesture is not placed within a perimeter, wherein the touch-based gesture is made on a graphical user interface presented on the touch-sensitive device, and wherein the perimeter is a boundary defined on the touch-sensitive device such that when the touch-based gesture is placed within the perimeter the touch-based gesture corresponds to an action associated with the perimeter;

determining a set of possible actions intended by the touch-based gesture, the set of possible actions including a first possible action and a second possible action, the first possible action corresponding to a first perimeter and the second possible action corresponding to a second perimeter;

selecting, using a disambiguation rule, the first possible action from the set of possible actions, wherein the first possible action is more likely than the second possible action according to the disambiguation rule;

causing the first possible action to occur at the touch-sensitive device; and changing, responsive to the first possible action being more likely than the second possible action according to the disambiguation rule, a first property of the first perimeter relative to a first property of the second perimeter in the graphical user interface, wherein the property of the first perimeter is a snap-to attraction factor of the first perimeter and the property of the second perimeter is a snap-to attraction factor of the second perimeter, and wherein the changing increases the snap-to attraction factor of the first perimeter to be greater than the snap-to attraction factor of the second perimeter such that the first perimeter has a higher degree of attractiveness to snap the touch-based gesture to the first perimeter as compared to a degree of attractiveness for snapping the touch-based gesture to the second perimeter.

* * * * *